United States Patent
Wallin et al.

(10) Patent No.: US 8,765,052 B2
(45) Date of Patent: Jul. 1, 2014

(54) ABRASION AND CORROSION RESISTANT ALLOY AND HARDFACING/CLADDING APPLICATIONS

(75) Inventors: Jack Wallin, Scottsville, KY (US); Ravi Menon, Goodlettsville, TN (US); Tim Barnhart, Bowling Green, KY (US)

(73) Assignee: Stoody Company, Bowling Green, KY (US)

( * ) Notice: Subject to any disclaimer, the term of this patent is extended or adjusted under 35 U.S.C. 154(b) by 121 days.

(21) Appl. No.: 13/431,737

(22) Filed: Mar. 27, 2012

(65) Prior Publication Data

US 2013/0260177 A1 Oct. 3, 2013

(51) Int. Cl.
  C22C 38/56 (2006.01)
  C22C 38/48 (2006.01)
  C22C 38/54 (2006.01)

(52) U.S. Cl.
  USPC ............ 420/12; 420/14; 420/17; 148/324; 148/325; 219/146.23; 428/681; 428/682

(58) Field of Classification Search
  CPC ........ C22C 38/44; C22C 38/48; C22C 38/54; C22C 38/56
  USPC ............. 420/12, 14, 15, 64, 69, 17; 148/324, 148/325; 219/76.1, 146.1, 146.23; 428/681, 428/682
  See application file for complete search history.

(56) References Cited

U.S. PATENT DOCUMENTS

| | | | |
|---|---|---|---|
| 3,165,400 A | 1/1965 | Roy et al. | |
| 4,122,238 A | 10/1978 | Frantzerb, Sr. | 428/558 |
| 4,331,857 A | 5/1982 | Crisci et al. | 219/137 |
| 4,396,822 A | 8/1983 | Kishida et al. | 219/137 |
| 4,423,119 A | 12/1983 | Brown et al. | 428/558 |
| 4,822,415 A | 4/1989 | Dorfman et al. | |
| 4,987,288 A | 1/1991 | Yonker, Jr. | 219/146.1 |
| 5,095,191 A | 3/1992 | Bushey et al. | 219/137 |
| 5,192,016 A | 3/1993 | Araki et al. | 228/147 |
| 5,525,779 A | 6/1996 | Santella et al. | 219/137 |
| 6,521,060 B1 | 2/2003 | Kurata et al. | 148/428 |
| 6,841,246 B2 | 1/2005 | Shimizu et al. | 428/375 |
| 6,940,042 B2 | 9/2005 | Hara et al. | 219/145.22 |
| 6,953,508 B2 | 10/2005 | Ikeda et al. | 148/320 |
| 2007/0187369 A1 | 8/2007 | Menon et al. | |
| 2007/0187458 A1 | 8/2007 | Menon et al. | |
| 2011/0162612 A1 | 7/2011 | Qiao et al. | |

FOREIGN PATENT DOCUMENTS

| | | |
|---|---|---|
| EP | 0271238 | 6/1988 |
| EP | 0371760 | 6/1990 |
| EP | 1785500 | 5/2007 |
| JP | S5976696 | 5/1984 |
| JP | 60-135556 | * 7/1985 |

OTHER PUBLICATIONS

English-hand translation of Japanese patent 60-135556, Iijima, Masayuki, Jul. 18, 1985.*
English abstract of Japanese patent 60-135556, Iijima, Masayuki, Jul. 18, 1985.*
International Search Report PCT/US2013/033868 mailed on Sep. 20, 2013.

* cited by examiner

Primary Examiner — Deborah Yee
(74) Attorney, Agent, or Firm — Brinks Gilson & Lione

(57) ABSTRACT

Weld deposit compositions with improved abrasion and corrosion resistance are provided by balancing percent weights of Chromium (Cr), Titanium (Ti), Niobium (Nb), and Boron (B) to allow the Chromium content of the weld matrix to be minimally reduced during carbide formation. The result is an enriched Chromium matrix that has excellent corrosion resistance in combination with highly abrasion resistant dispersed carbides.

27 Claims, 4 Drawing Sheets

ABRASION AND CORROSION RESISTANT ALLOY AND HARDFACING/CLADDING APPLICATIONS

FIELD

The present disclosure relates to alloy compositions for hardfacing and/or cladding applications, and more particularly to welding wire compositions and the use of such compositions in applications to resist abrasion and corrosion.

BACKGROUND

The statements in this section merely provide background information related to the present disclosure and may not constitute prior art.

Hardfacing relates generally to techniques or methods of applying a hard, wear resistant alloy to the surface of a substrate, such as a softer metal, to reduce wear caused by abrasion, abrasion, corrosion, and heat, among other operational or environmental conditions. In some applications, there exists abrasion in a corrosive environment, which can cause excessive and accelerated wear of the base metal.

A variety of methods are available to apply the wear resistant alloy to the substrate, among which includes welding, where a welding wire is deposited over the substrate surface to produce a weld deposit that is highly wear resistant. The welding wire may include a solid wire, metal-cored wire or a flux-cored wire, wherein the metal-cored wire generally comprises a metal sheath filled with a powdered metal alloy and the flux-cored wire generally comprises a mixture of powdered metal and fluxing ingredients. Accordingly, flux-cored and metal-cored wires offer additional versatility due to the wide variety of alloys that can be included within the powdered metal core in addition to the alloy content provided by the sheath. Cladding uses a similar welding process and generally applies a relatively thick layer of filler metal to a carbon or low-alloy steel base metal to provide a corrosion-resistant surface.

Conventional chromium carbides and complex carbides have exceptional wear resistance, which is attributed to the high concentration of primary chromium carbides in an iron matrix. However, formation of such carbides depletes the matrix of chromium, thus reducing the ability to resist corrosion. Other alloys with increased chromium levels in the matrix are devoid of primary chromium carbides, thus reducing abrasion resistance.

Improved compositions in the areas of hardfacing and cladding are continually desired in the field of welding, especially in environments that are both abrasive and corrosive.

SUMMARY

In general, a welding wire having a complex carbide composition is provided that is designed for use in hardfacing and/or cladding applications, to resist both abrasion and corrosion. The welding wire composition according to the present disclosure is particularly suitable for pipe, plate, and vessel applications to resist abrasion and corrosion. Preliminary testing has shown an increase in abrasion resistance of up to about 600% for gas metal arc welding (GMAW) applications, and an increase in corrosion resistance up to about 40% for flux cored arc welding (FCAW).

In one form, a welding wire is manufactured by forming a mild steel sheath into a tube and filling the tube with various alloy powders. The filled sheath is then formed to size by rolling and/or drawing. After welding, the sheath and alloy powder produce a semi-austenitic weld deposit matrix with finely dispersed Titanium (Ti), Niobium (Nb), and Boron (B) carbides. Advantageously, the percent weight of Chromium (Cr), Titanium (Ti), Niobium (Nb), and Boron (B) in the compositions of the present disclosure have been balanced, thus allowing the Chromium (Cr) content of the matrix to be minimally reduced during carbide formation. The resulting enriched Chromium (Cr) matrix provides significantly improved corrosion resistance in addition to highly abrasion resistant dispersed carbides.

In one form of the present disclosure, a weld deposit composition for a GMAW application is provided that comprises, by percent mass, between approximately 1.8% and approximately 2.5% Carbon (C), between approximately 0.8% and approximately 1.4% Manganese (Mn), between approximately 0.6% and approximately 1.2% Silicon (Si), between approximately 23.0% and approximately 26.0% Chromium (Cr), between approximately 2.0% and approximately 3.0% Nickel (Ni), between approximately 0.7% and approximately 1.5% Molybdenum (Mo), between approximately 2.6% and approximately 3.6% Niobium (Nb), less than approximately 0.5% Titanium (Ti), between approximately 0.3% and approximately 0.8% Boron (B), between approximately 0% and approximately 0.4% Zirconium (Zr), and a balance comprising Iron. In additional forms, the Carbon comprises approximately 2.2%, the Manganese comprises approximately 1.1%, the Silicon comprises approximately 0.8%, the Chromium comprises approximately 24.5%, the Nickel comprises approximately 2.5%, the Molybdenum comprises approximately 1.1%, the Niobium comprises approximately 3.0%, the Titanium comprises approximately 0.2%, the Boron comprises approximately 0.6%, and the Zirconium comprises approximately 0%.

In another form, a weld deposit composition for an FCAW application is provided that comprises, by percent mass, between approximately 3.7% and approximately 4.3% Carbon (C), between approximately 0.8% and approximately 1.2% Manganese (Mn), between approximately 0.3% and approximately 1.0% Silicon (Si), between approximately 24.0% and approximately 26.0% Chromium (Cr), between approximately 1.3% and approximately 2.0% Molybdenum (Mo), between approximately 2.6% and approximately 3.6% Niobium (Nb), less than approximately 0.3% Titanium (Ti), between approximately 0.4% and approximately 0.9% Boron (B), between approximately 0.1% and approximately 0.4% Zirconium (Zr), and a balance comprising Iron. In additional forms, the Carbon comprises approximately 4.0%, the Manganese comprises approximately 1.0%, the Silicon comprises approximately 0.5%, the Chromium comprises approximately 25.0%, the Molybdenum comprises approximately 1.5%, the Niobium comprises approximately 3.0%, the Titanium comprises approximately 0.1%, the Boron comprises approximately 0.75%, and the Zirconium comprises approximately 0.25%.

In yet other forms of the present disclosure, a welding wire, or a flux-cored or metal-cored welding wire capable of producing a weld deposit having the above-mentioned elements and a welded structure having a weld deposit with the above elements is provided by the teachings of the present disclosure. The welded structure may be, by way of example, pipes, plates, or vessels.

Further areas of applicability will become apparent from the description provided herein. It should be understood that the description and specific examples are intended for pur-

DETAILED DESCRIPTION

Figure 1:
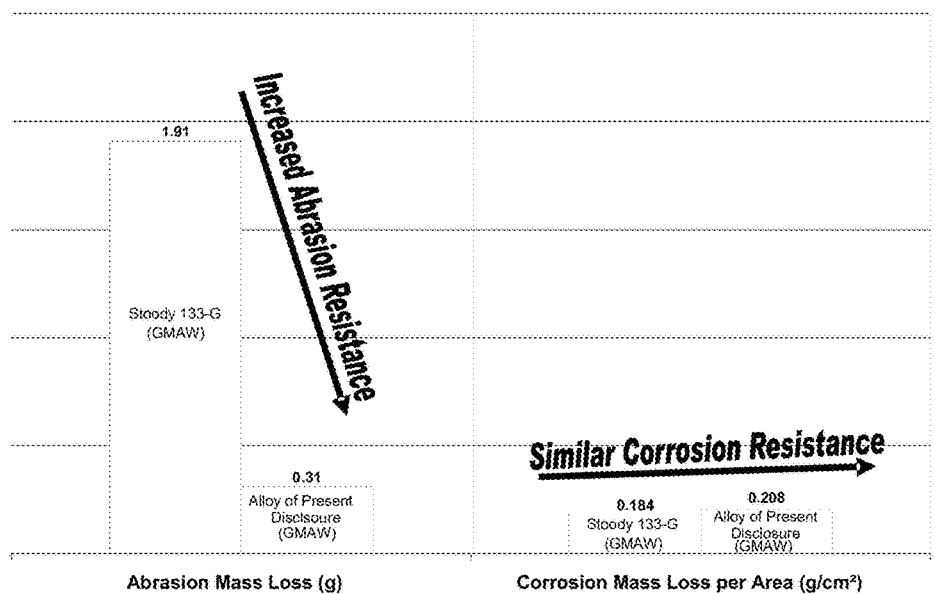
FIG. 1 includes plots of abrasion mass loss and corrosion mass loss per area for a GMAW weld alloy composition as well as a comparative composition Stoody 133-G.

The following description is merely exemplary in nature and is not intended to limit the present disclosure, application, or uses. It should be understood that throughout the drawings, corresponding reference numerals indicate like or corresponding parts and features.

Weld alloy compositions for use in hardfacing and/or cladding applications that improved both abrasion and corrosion resistance are provided by balancing percent weights of Chromium (Cr), Titanium (Ti), Niobium (Nb), and Boron (B). This balancing allows the Chromium (Cr) content of the matrix to be minimally reduced during carbide formation. An enriched Chromium (Cr) matrix results, thus providing an alloy with excellent corrosion resistance in combination with highly abrasion resistant dispersed carbides. In one form, a weld deposit is produced from a flux-cored wire, however, it should be understood that other types of welding consumables such as a solid wire or coated shielded metal arc electrodes may also be employed while remaining within the scope of the present disclosure. The weld deposit characteristics include a complex carbide composition, a semi-austenitic weld deposit matrix with finely dispersed Titanium (Ti), Niobium (Nb), and Boron (B) carbides, and an enriched Chromium (Cr) matrix. Additional alloying elements are provided for various properties of the weld deposit and are described in greater detail below.

The specific alloy elements and their amounts that are present in the weld deposits according to the teachings of the present disclosure are now described in greater detail.

Referring to Table 1 and 2 below, two (2) weld deposit compositions (including both target percentages and ranges of percent elements by weight) according to the present disclosure are listed for both GMAW and FCAW applications, along with typical GMAW and FCAW compositions for purposes of comparison.

TABLE 1

| Element | Stoody 133-G (GMAW) (typical) | Alloy Composition Target (GMAW) | Alloy Composition Ranges (GMAW) |
|---|---|---|---|
| C | 1.5 | 2.2 | 1.8-2.5 |
| Mn | 1.4 | 1.1 | 0.8-1.4 |
| Si | 0.8 | 0.8 | 0.6-1.2 |
| Cr | 24.7 | 24.5 | 23.0-26.0 |
| Ni | 2.9 | 2.5 | 2.0-3.0 |
| Mo | 0.8 | 1.1 | 0.7-1.5 |
| Cb | — | 3.0 | 2.6-3.6 |
| Ti | — | 0.2 | 0-0.5 |
| B | — | 0.6 | 0.3-0.8 |
| Zr | — | — | 0-0.4 |
| Fe | Balance | Balance | Balance |

TABLE 2

| Element | Stoody PC2009 (FCAW) (typical) | Alloy Composition Target (FCAW) | Alloy Composition Ranges (FCAW) |
|---|---|---|---|
| C | 5.5 | 4.0 | 3.7-4.3 |
| Mn | 1.5 | 1.0 | 0.8-1.2 |
| Si | 1.3 | 0.5 | 0.3-1.0 |
| Cr | 27.9 | 25.0 | 24.0-26.0 |
| Ni | — | — | — |
| Mo | — | 1.5 | 1.3-2.0 |
| Cb | — | 3.0 | 2.6-3.6 |
| Ti | — | 0.1 | 0-0.3 |
| B | — | 0.75 | 0.4-0.9 |
| Zr | 0.4 | 0.25 | 0.1-0.4 |
| Fe | Balance | Balance | Balance |

Each element and its contribution to properties of the weld deposit are now described in greater detail. Amounts of elements are by weight unless otherwise indicated.

Carbon (C) is an element that improves hardness and abrasion resistance. The preferred amount of Carbon for GMAW is between approximately 1.8 and 2.5 percent, with a target value of approximately 2.2%. The preferred amount of Carbon for FCAW is between approximately 3.7 and 4.3 percent, with a target value of approximately 4.0%.

Manganese (Mn) is an element that improves hardness, toughness and acts as a deoxidizer, in which the deoxidizer also acts as a grain refiner when fine oxides are not floated out of the metal. Manganese also stabilizes austenite thus leading to better ductility of overlay. The preferred amount of manganese for the GMAW application is between approximately 0.8 and 1.4 percent, with a target value of approximately 1.1%. The preferred amount of manganese for the FCAW application is between approximately 0.8 and 1.2 percent, with a target value of approximately 1.0%.

Silicon (Si) is an element that acts as a deoxidizer to improve corrosion resistance and which also acts as a grain refiner when fine oxides are not floated out of the metal. The preferred amount of Silicon for the GMAW application is between approximately 0.6 and 1.2 percent, with a target value of approximately 0.8%. The preferred amount of Silicon for the FCAW application is between approximately 0.3 and 1.0 percent, with a target value of approximately 0.5%. Silicon is also added to the weld metal to improve fluidity.

Chromium (Cr) is an element that provides abrasion resistance as chromium carbide, corrosion resistance, carbide/boride formation, and improved high temperature creep strength. The preferred amount of Chromium for the GMAW application is between approximately 23.0 and approximately 26.0 percent, with a target value of approximately 24.5%. The preferred amount of Chromium for the FCAW application is between approximately 24.0 and approximately 26.0 percent, with a target value of approximately 25.0%.

Nickel (Ni) is an element that provides improved ductility, which improves resistance to impacts at lower temperatures, and provokes the formation of austenite thus leading to less relief check cracking. The preferred amount of Nickel for the GMAW application is between approximately 2.0 and 3.0 percent, with a target value of approximately 2.5%. There is no Nickel addition for the FCAW application.

Molybdenum (Mo) is an element that provides improved tensile strength of the weld deposit as carbide, boride, or a solid-solution strengthener. Molybdenum also provides resistance to pitting corrosion. The preferred amount of Molybdenum for the GMAW application is between approximately 0.7 and approximately 1.5 percent, with a target value of approximately 1.1%. The preferred amount of Molybdenum for the FCAW application is between approximately 1.3 and approximately 2.0 percent, with a target value of approximately 1.5%.

Titanium (Ti) and Niobium (Nb) act as grain refiners, deoxidizers, and primary carbide/boride formers. The amounts of Titanium and Niobium are balanced with the amount of Boron as set forth above in order to allow the Chromium content to be minimally reduced, which significantly increases both abrasion and corrosion resistance, as set forth in greater detail below. The preferred amount of Niobium for the GMAW application is between approximately 2.6 and 3.6 percent, with a target value of approximately 3.0%. The preferred amount of Titanium for the GMAW application is less than about 0.5 percent, with a target value of approximately 0.2%. The preferred amount of Titanium for the FCAW application is less than about 0.3 percent, with a target value of approximately 0.1%.

Boron (B) is an element that provides interstitial hardening in the matrix, strengthens the grain boundaries by accommodating mismatches due to incident lattice angles of neighboring grains with respect to the common grain boundary, and by itself or in combination with Carbon, form nucleation sites as intermetallics with Titanium and/or Niobium. The preferred amount of Boron for the GMAW application is between approximately 0.3 and approximately 0.8 percent, with a target value of approximately 0.6%. The preferred amount of Boron for the FCAW application is between approximately 0.4 and approximately 0.9 percent, with a target value of approximately 0.75%.

Zirconium (Zr) is an alloying element that provides improved corrosion resistance and reduces fluidity of the puddle allowing it to be used for out-of-position welding. The preferred amount of Zirconium for the GMAW application is between approximately zero and 0.4 percent, with a target value of zero. The preferred amount of Zirconium for the FCAW application is between approximately 0.1 and 0.4 percent, with a target value of approximately 0.25%.

Titanium and Niobium combined with Carbon and/or Boron can provide nucleation sites for the formation of Titanium and/or Niobium carbides. Boron provides interstitial hardening in the matrix and strengthens the grain boundaries by accommodating mismatches due to incident lattice angles of neighboring grain with respect to the common grain boundary. Boron in combination with Carbon forms nucleation sites as intermetallics with Titanium and/or Niobium. By balancing the Titanium and/or Niobium with the Carbon and Boron content, optimum corrosion and abrasion resistance can be achieved.

The compositions of the weld deposits according to the teachings of the present disclosure are formulated to allow the Chromium (Cr) content of the weld matrix to be minimally reduced. In exemplary testing, the compositions have shown significant increases in abrasion and corrosion resistance when compared to the typical GMAW and FCAW weld deposit compositions as shown below in Table 3 and Table 4.

TABLE 3

|  | Stoody 133-G (GMAW) | Alloy of Present Disclosure (GMAW) | Alloy of Present Disclosure Ranges (GMAW) |
|---|---|---|---|
| Hardness (HRC) | 41 | 55 | 50-60 |
| G65 (g) | 1.91 | 0.31 | 0.20-0.50 |
| G48 (g/cm$^2$) | 0.184 | 0.208 | 0.185-0.265 |

TABLE 4

|  | Stoody PC2009 (FCAW) | Alloy of Present Disclosure (FCAW) | Alloy of Present Disclosure Ranges (FCAW) |
|---|---|---|---|
| Hardness (HRC) | 62 | 67 | 62-70 |
| G65 (g) | 0.14 | 0.15 | 0.11-0.20 |
| G48 (g/cm$^2$) | 0.493 | 0.290 | 0.230-0.350 |

Figure 2:
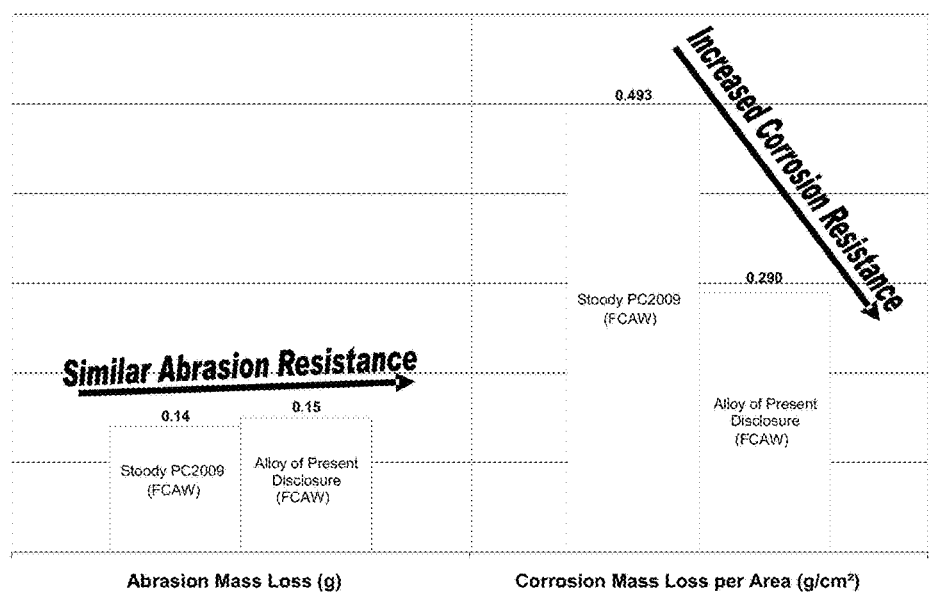
FIG. 2 includes plots of abrasion mass loss and corrosion mass loss per area for a FCAW weld alloy composition as well as a comparative composition Stoody PC2009.

These test results correspond to the compositions listed above in Table 1 and Table 2. As shown in FIG. 1, the compositions according GMAW applications yield up to about a 600% increase in wear resistance. As shown in FIG. 2, the compositions according to FCAW applications yield up to about a 40% increase in corrosion resistance.

Figure 3:
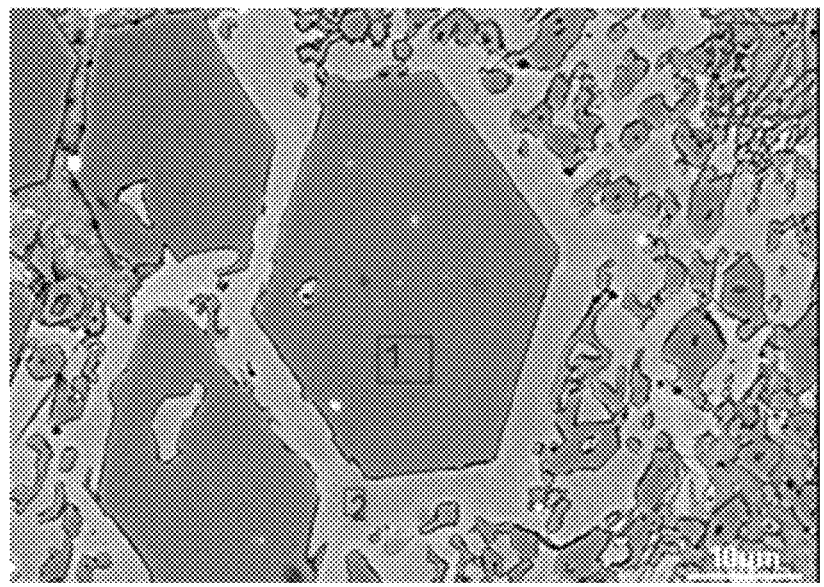
FIG. 3 is a micrograph of the microstructure of an alloy Stoody PC2009.
Figure 4:
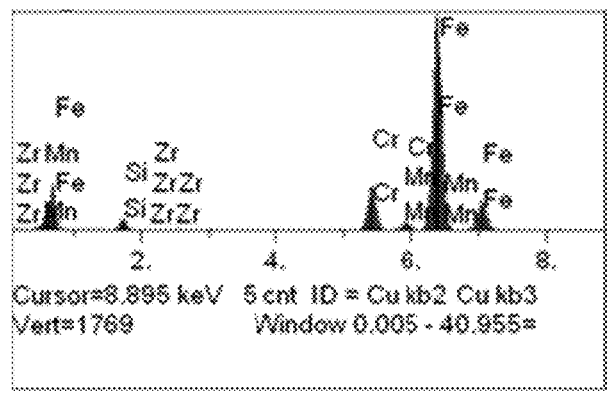
FIG. 4 is a measured plots of composition of an alloy Stoody PC2009.
Figure 5:
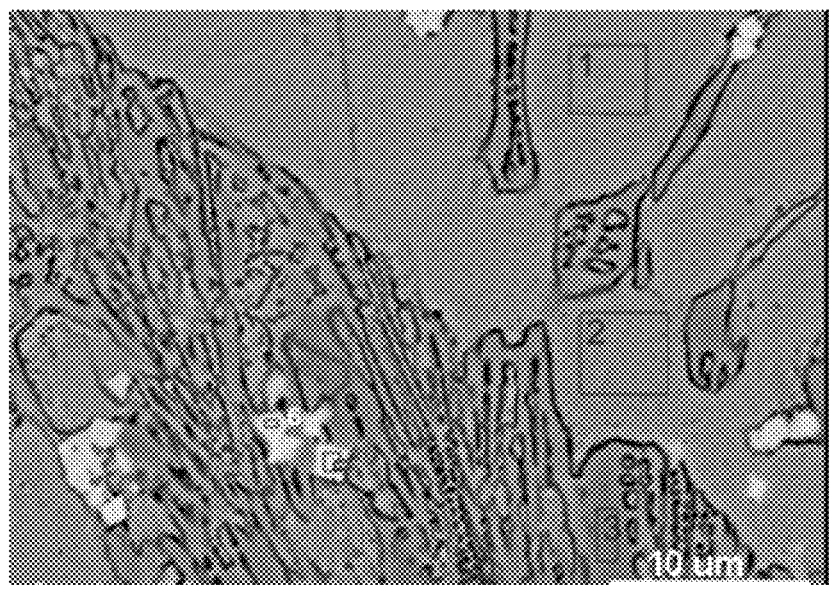
FIG. 5 is a micrograph of the microstructure of a weld alloy described herein.
Figure 6:
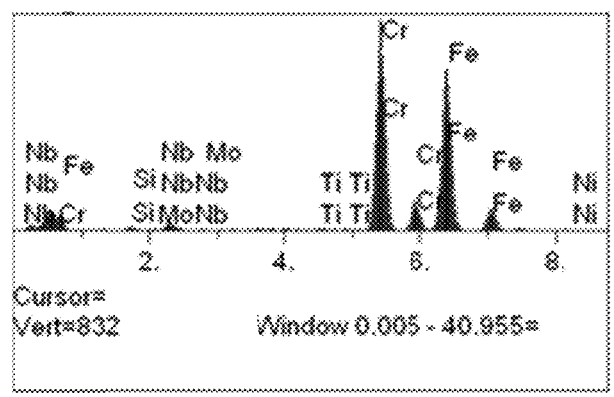
FIG. 6 is a measured plots of composition of a weld alloy described herein.

Percentage of matrix chromium of alloy of Stoody PC2009 and an example alloy of the present disclosure and are compared in Table 5 and Table 6, respectively. Percentage of matrix chromium was also graphically verified. FIG. 4 and FIG. 6 are measured plots of alloys of Table 5 and Table 6, respectively. In addition, FIG. 3 and FIG. 5 are micrographs of the microstructure for alloys of Table 5 and Table 6, respectively.

TABLE 5

| Element | Line | Intensity (c/s) | Error 2-sig | Atomic % | Weight % |
|---|---|---|---|---|---|
| C | Ka | 0.00 | 0.000 | 0.000 | 0.000 |
| Si | Ka | 41.04 | 2.339 | 5.948 | 3.103 |
| Cr | Ka | 177.05 | 4.858 | 9.930 | 9.592 |
| Mn | Ka | 15.93 | 1.458 | 1.211 | 1.236 |
| Fe | Ka | 927.31 | 11.119 | 82.819 | 85.914 |
| Zr | La | 1.13 | 0.388 | 0.092 | 0.156 |
|  |  |  |  | 100.000 | 100.000 Total |

TABLE 6

| Element | Line | Intensity (c/s) | Error 2-sig | Atomic % | Weight % |
|---|---|---|---|---|---|
| Si | Ka | 7.04 | 0.969 | 1.610 | 0.833 |
| Ti | Ka | 3.70 | 0.702 | 0.335 | 0.296 |
| Cr | Ka | 397.59 | 7.281 | 44.287 | 42.456 |
| Fe | Ka | 323.42 | 6.567 | 51.391 | 52.912 |
| Ni | Ka | 4.83 | 0.802 | 1.021 | 1.105 |
| Nb | La | 0.00 | 0.000 | 0.000 | 0.000 |
| Mo | La | 13.50 | 1.341 | 1.356 | 2.398 |
|  |  |  |  | 100.000 | 100.000 Total |

The description of the disclosure is merely exemplary in nature and, thus, variations that do not depart from the gist of the disclosure are intended to be within the scope of the disclosure. For example, the weld deposit according to the teachings of the present disclosure may be produced from welding wire types other than flux-cored/metal-cored wires, such as solid wires, shielded metal arc wires, stick electrodes, and PTA powders, while remaining within the scope of the present disclosure. Such variations are not to be regarded as a departure from the spirit and scope of the disclosure.

What is claimed is:

1. A weld deposit composition for a GMAW application comprising, by percent mass:
   between approximately 1.8% and approximately 2.5% Carbon;
   between approximately 0.8% and approximately 1.4% Manganese;
   between approximately 0.6% and approximately 1.2% Silicon;
   between approximately 23.0% and approximately 26.0% Chromium;
   between approximately 2.0% and approximately 3.0% Nickel;
   between approximately 0.7% and approximately 1.5% Molybdenum;
   between approximately 2.6% and approximately 3.6% Niobium;
   less than approximately 0.5% Titanium;
   between approximately 0.3% and approximately 0.8% Boron;
   between approximately 0% and approximately 0.4% Zirconium; and
   a balance comprising Iron;
   wherein the amount of Niobium and Titanium are balanced with the amount of Boron to form intermetallic borides therewith.

2. The weld deposit composition according to claim 1, wherein the Carbon comprises approximately 2.2%.

3. The weld deposit composition according to claim 1, wherein the Manganese comprises approximately 1.1%.

4. The weld deposit composition according to claim 1, wherein the Silicon comprises approximately 0.8%.

5. The weld deposit composition according to claim 1, wherein the Chromium comprises approximately 24.5%.

6. The weld deposit composition according to claim 1, wherein the Nickel comprises approximately 2.5%.

7. The weld deposit composition according to claim 1, wherein the Molybdenum comprises approximately 1.1%.

8. The weld deposit composition according to claim 1, wherein the Niobium comprises approximately 3.0%.

9. The weld deposit composition according to claim 1, wherein the Titanium comprises approximately 0.2%.

10. The weld deposit composition according to claim 1, wherein the Boron comprises approximately 0.6%.

11. The weld deposit composition according to claim 1, wherein the Zirconium comprises approximately 0%.

12. A welding wire capable of producing a weld deposit according to claim 1.

13. A welded structure comprising a weld deposit according to claim 1.

14. The welded structure according to claim 13, wherein the welded structure is selected from the group consisting of pipes, plates, and vessels.

15. A weld deposit composition for an FCAW application comprising, by percent mass:
    between approximately 3.7% and approximately 4.3% Carbon;
    between approximately 0.8% and approximately 1.2% Manganese;
    between approximately 0.3% and approximately 1.0% Silicon;
    between approximately 24.0% and approximately 26.0% Chromium;
    between approximately 1.3% and approximately 2.0% Molybdenum;
    between approximately 2.6% and approximately 3.6% Niobium;
    less than approximately 0.3% Titanium;
    between approximately 0.4% and approximately 0.9% Boron;
    between approximately 0.1% and approximately 0.4% Zirconium; and
    a balance comprising Iron;
    wherein the amount of Niobium and Titanium are balanced with the amount of Boron to form intermetallic borides therewith.

16. The weld deposit composition according to claim 15, wherein the Carbon comprises approximately 4.0%.

17. The weld deposit composition according to claim 15, wherein the Manganese comprises approximately 1.0%.

18. The weld deposit composition according to claim 15, wherein the Silicon comprises approximately 0.5%.

19. The weld deposit composition according to claim 15, wherein the Chromium comprises approximately 25.0%.

20. The weld deposit composition according to claim 15, wherein the Molybdenum comprises approximately 1.5%.

21. The weld deposit composition according to claim 15, wherein the Niobium comprises approximately 3.0%.

22. The weld deposit composition according to claim 15, wherein the Titanium comprises approximately 0.1%.

23. The weld deposit composition according to claim 15, wherein the Boron comprises approximately 0.75%.

24. The weld deposit composition according to claim 15, wherein the Zirconium comprises approximately 0.25%.

25. A welding wire capable of producing a weld deposit according to claim 15.

26. A welded structure comprising a weld deposit according to claim 15.

27. The welded structure according to claim 26, wherein the welded structure is selected from the group consisting of pipes, plates, and vessels.

* * * * *